United States Patent
Blaylock et al.

(10) Patent No.: US 7,481,056 B2
(45) Date of Patent: Jan. 27, 2009

(54) TURBOCHARGER WITH ADJUSTABLE THROAT

(76) Inventors: Jimmy L. Blaylock, 3101 Military Ave., Baxter Springs, KS (US) 66713; Richard T. Brown, 1820 E. 20th, Joplin, MO (US) 64804

( * ) Notice: Subject to any disclaimer, the term of this patent is extended or adjusted under 35 U.S.C. 154(b) by 0 days.

(21) Appl. No.: 11/715,807

(22) Filed: Mar. 8, 2007

(65) Prior Publication Data

US 2007/0227142 A1    Oct. 4, 2007

Related U.S. Application Data

(60) Provisional application No. 60/767,467, filed on Mar. 30, 2006.

(51) Int. Cl.
| | |
|---|---|
| F02D 23/00 | (2006.01) |
| F01D 1/02 | (2006.01) |
| F04D 29/44 | (2006.01) |
| F04D 29/54 | (2006.01) |
| F02B 37/12 | (2006.01) |
| F02B 37/00 | (2006.01) |

(52) U.S. Cl. .................. 60/602; 415/205; 415/151
(58) Field of Classification Search ............... 60/602; 415/151, 155, 205, 159, 163–164, 223; 137/106–107, 137/102
See application file for complete search history.

(56) References Cited

U.S. PATENT DOCUMENTS

| | | | | |
|---|---|---|---|---|
| 41,567 | A * | 2/1864 | Brooks ..................... 415/205 |
| 98,741 | A * | 1/1870 | Chase ...................... 415/205 |
| 2,944,786 | A | 7/1960 | Angell et al. ............... 415/155 |
| 3,150,814 | A * | 9/1964 | Evans et al. .................. 60/602 |
| 3,313,518 | A * | 4/1967 | Nancarrow ................ 415/205 |
| 3,423,926 | A * | 1/1969 | Nancarrow et al. ........... 60/602 |
| 3,552,876 | A * | 1/1971 | Updike ...................... 415/205 |
| 3,844,676 | A * | 10/1974 | Betteridge .................. 60/602 |
| 4,177,005 | A * | 12/1979 | Bozung et al. .............. 415/205 |
| 4,177,006 | A | 12/1979 | Nancarrow ................ 415/151 |
| 4,179,247 | A | 12/1979 | Osborn ...................... 415/163 |
| 4,389,845 | A | 6/1983 | Koike .......................... 60/602 |
| 4,502,282 | A | 3/1985 | Kanesaka ................... 60/602 |
| 4,510,754 | A | 4/1985 | Rahnke ....................... 60/602 |
| 4,519,211 | A | 5/1985 | Sedille et al. ................. 60/602 |
| 4,565,068 | A | 1/1986 | Schneider .................... 60/602 |
| 4,658,586 | A | 4/1987 | Iwasa .......................... 60/602 |

(Continued)

FOREIGN PATENT DOCUMENTS

GB        A-1182832        3/1970

(Continued)

*Primary Examiner*—Thai-Ba Trieu
(74) *Attorney, Agent, or Firm*—Gable Gotwals

(57) ABSTRACT

An exhaust gas turbocharger for an internal combustion engine has a flow control gate that is timely pivotal and located within the exhaust gas inlet downstream of the flow splitter. Control is provided to timely pivot the flow control gate toward the turbine rotor and thus provides an initial high velocity spin to the rotor when turbo charged boost pressure is demanded from an adjustable direction flow control valve. The control valve uses boost pressure from the compressor to timely actuate a piston and lever connected to the pivotal flow control gate, or a signal from an engine control module (ECM) can be directed to a hydraulic, pneumatic or electrical actuator having a reciprocal control rod connected to the flow control gate.

28 Claims, 6 Drawing Sheets

U.S. PATENT DOCUMENTS

| | | | |
|---|---|---|---|
| 4,660,382 A | 4/1987 | Ueno et al. | 60/602 |
| 4,729,715 A | 3/1988 | Wilde | 415/159 |
| 4,893,474 A | 1/1990 | Miller et al. | 60/602 |
| 4,927,325 A | 5/1990 | Yano | 415/163 |
| 5,155,998 A * | 10/1992 | Monden | 60/602 |
| 5,960,814 A * | 10/1999 | Kot | 137/106 |
| 6,073,447 A | 6/2000 | Kawakami et al. | 60/602 |
| 6,272,859 B1 | 8/2001 | Barnes et al. | 60/602 |
| 6,598,395 B2 | 7/2003 | Daudel et al. | 60/602 |
| 6,625,985 B2 | 9/2003 | Shirakawa | 60/602 |

FOREIGN PATENT DOCUMENTS

| | | |
|---|---|---|
| JP | 57024402 A * | 2/1982 |
| JP | 57024403 A * | 2/1982 |
| JP | 60006020 A * | 1/1985 |
| JP | 60206937 A * | 10/1985 |

* cited by examiner

TURBOCHARGER WITH ADJUSTABLE THROAT

CROSS REFERENCE

This is a continuation-in-part of Provisional Patent Application Ser. No. 60/767,467 filed on Mar. 30, 2006.

FIELD OF THE INVENTION

The present invention relates to a turbocharger, for use with an internal combustion engine particularly where there is control over the rotational speed of an exhaust turbine rotor as a function of the boost pressure fed to the intake manifold.

BACKGROUND OF THE INVENTION

Turbochargers are well known devices for supplying air to the intake of an internal combustion engine at pressures above atmospheric, commonly called "boost pressures" and are widely used in all forms of vehicles.

A conventional turbocharger includes a turbine rotor or wheel with a plurality of fins inside a volute turbine housing. The turbine rotor is rotated by exhaust gases from the engine which impinge upon the turbine fins. The rotor, via a connecting shaft, provides the driving torque to a compressor. Ambient air fed to the compressor creates a boost pressure that is fed to the intake manifold of the engine. The flow capacity of the exhaust turbine is a function of the casing volute areas, and the passage of the exhaust gases as it strikes the turbine fins. The flow of exhaust gas has to be regulated to control the compressor speed to create the desired boost in manifold pressure.

A typical centrifugal compressor includes an impeller driven at high speed by the turbine rotor. A diffuser surrounding the impeller causes the ambient air to increase in pressure which is directed to the intake manifold.

One particular goal with any turbocharger is the need for a quick response, i.e., prevent time lag or a delay between the time when high power output is first demanded of the engine by setting the throttle to a wide open position and the time when a boost in the inlet manifold air pressure is delivered by the compressor. In some instances a time lag could result in a dangerous driving situation when substantially instantaneous response is desired.

Others have proposed variable geometry turbines and moveable vanes for guiding, dividing, or changing the direction the exhaust gases relative to the to the turbine rotor and thereby control its rotational speed.

U.S. Pat. No. 4,893,474 describes a pivoting valve member that is actuated by a spring loaded bell-crank lever to control a wastegate valve to vent the exhaust passages. Wastegates are often used in turbochargers to open at high speed to bypass a portion of the exhaust gas flow in the turbine to keep the speed of the turbocharger low and thereby maintain the intake manifold pressure below a given critical value.

U.S. Pat. Nos. 4,510,754 and 6,073,447 teach the use of separate first and second passages, of differing cross-sections, for the passage of exhaust gases into the volute. The passages being selectively opened and closed by a flapper valve and associated control system.

U.S. Pat. Nos. 4,565,068 and 4,927,325 describe an inlet opening to the volute with a concentric divided partition and a plurality of concentric fixed individual wall segments arranged in the direction of flow. The space between the wall segments create orifices to contribute uniform impingement on the turbine rotor.

U.S. Pat. No. 4,729,715 provides at least one or a plurality of moveable wall members to vary the passage area, yet allowing the whole flow of exhaust gas through the volute. The wall member is a vane that includes a passage between the front and rear of the vane that becomes a nozzle to aid in distributing the passage of gas in the volute.

Others such as U.S. Pat. No. 4,179,247 have proposed variable area turbines (VAT) or U.S. Pat. No. 6,272,859 a variable geometry turbine (VGT) with variable nozzle vanes or with turbine vanes individually pivotal.

Such devices usually require complex turbine volute housings and control means.

SUMMARY OF THE INVENTION

The present invention is directed to a variable turbocharger which typically comprises a volute type housing, an exhaust driven turbine rotor which drives a compressor for providing boost pressure air to the intake manifold of an internal combustion engine. A flow control gate is positioned in the inlet to the housing and adapted, from a command, to rotate or pivot downstream about a transverse hinge from a neutral first position to a second position toward the vanes of the turbine rotor.

Another embodiment is directed to modification and or retrofitting of the inlet throat of the volute with a heat resistant fixed flow splitter to divide, equally or unequally, the flow of exhaust into an outer path and an inner path adjacent to the turbine rotor. At the downstream end of the flow splitter is a pivotal flow control gate that can be moved in the inner path from a neutral first position to a second position toward the vanes of the turbine rotor. In the second position, the flow control gate closes the inner path creating greater velocity of exhaust gas flow against the rotor and thus provide an initial rapid 'spin-up' of the turbine rotor. This reduces the volume of exhaust gas to the inner path yet increases the velocity and/or pressure upon the turbine rotor. This causes the turbocharger to reach optimal operating speed to substantially reduce or eliminate harmful emissions while increasing initial engine takeoff power and reducing lag time from when speedup was first signaled by the operator.

Operation of the flow control gate can include using a microcomputer based electronic control module (ECM). Typically an ECM receives inputs relating to but not limited to vehicle speed, ambient air conditions, engine parameters as to throttle position, fuel being injected and the actual and desired boost pressures and flow control gate position. Appropriate signal from the ECM can be directed to an actuator which pivots the flow control gate. Such an actuator could be controlled pneumatically, hydraulically or electrically, e.g., solenoid.

Specifically, in one embodiment, the operation of the pivotal flow control gate is controlled by boost pressure to and through a pneumatic directional flow control valve which moves a piston in a two way air cylinder actuator. The piston is connected to a control lever attached to the pivotal flow control gate. The flow control valve and air cylinder are timely actuated by the boost pressure input upon turbocharger demand. The flow control valve is includes a spring loaded adjustment means that controls the timing and operation of the pivotal flow control gate from a first neutral position to its second operational position and vice versa.

DETAILED DESCRIPTION OF THE DRAWINGS

Figure 1:
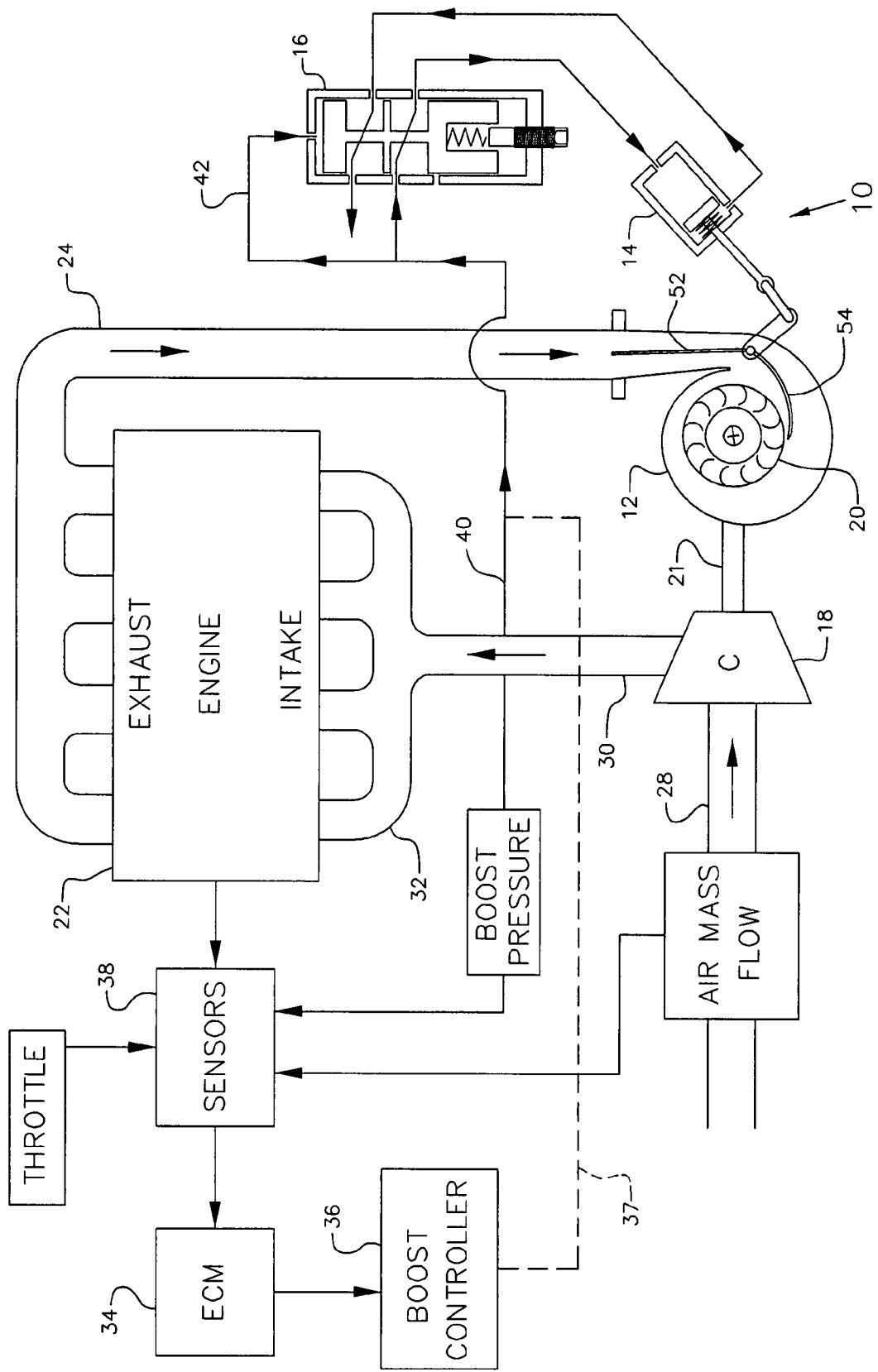
FIG. 1 is a block diagram of one form of an engine and turbocharger control system with the present device indicated.

Referring to FIG. 1 the variable area turbocharger and its control system is generally indicated by the numeral 10 which comprises a volute or spiral configured turbine chamber 12, an actuator housing 14, and a directional control valve 16 details and operation of which are described below.

The compressor takes ambient air via intake 28, compresses and discharges air at greater than atmospheric pressure, called "boost pressure", into the engine intake manifold 32 via conduit 30.

The control system of this invention can include a microcomputer based electronic or engine control module (ECM) 34 which in one concept uses a boost controller 36 to send appropriate signal shown by dotted line 37 to conduit 40 to operate the turbocharger control system 10. As is well known in the art, sensors 38 relate to various engine parameters and conditions used by the ECM to assure maximum efficiency of the turbocharger, and are not described in detail herein.

Boost pressure via conduit 40 is used to operate the turbocharger and control system 10 as hereinafter described.

Figure 2:
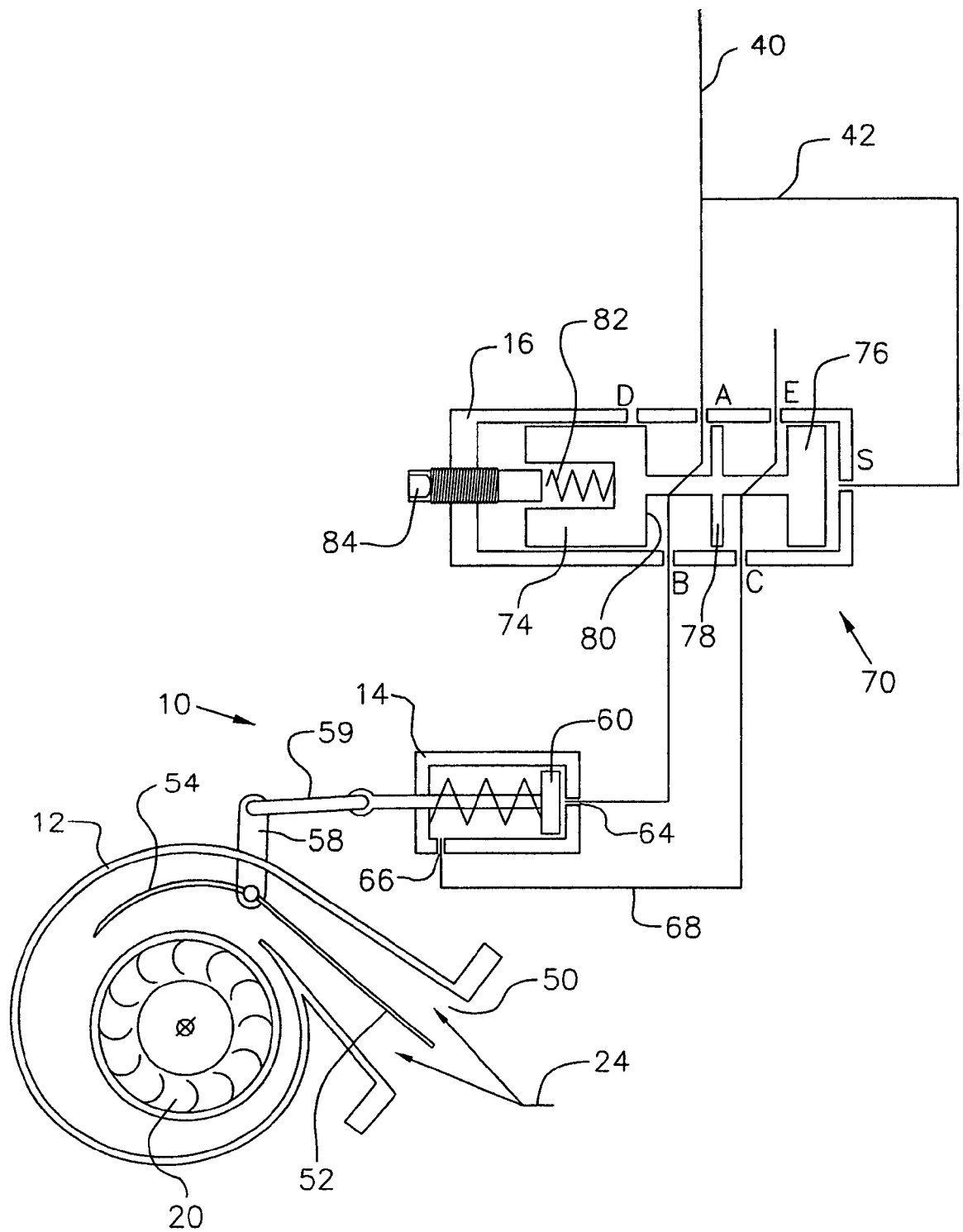
FIG. 2 is a schematic depicting the operation of the turbocharger of this invention when in the neutral position, as for example, when the engine is under light load or with minimal boost pressure to the intake manifold.
Figure 3:
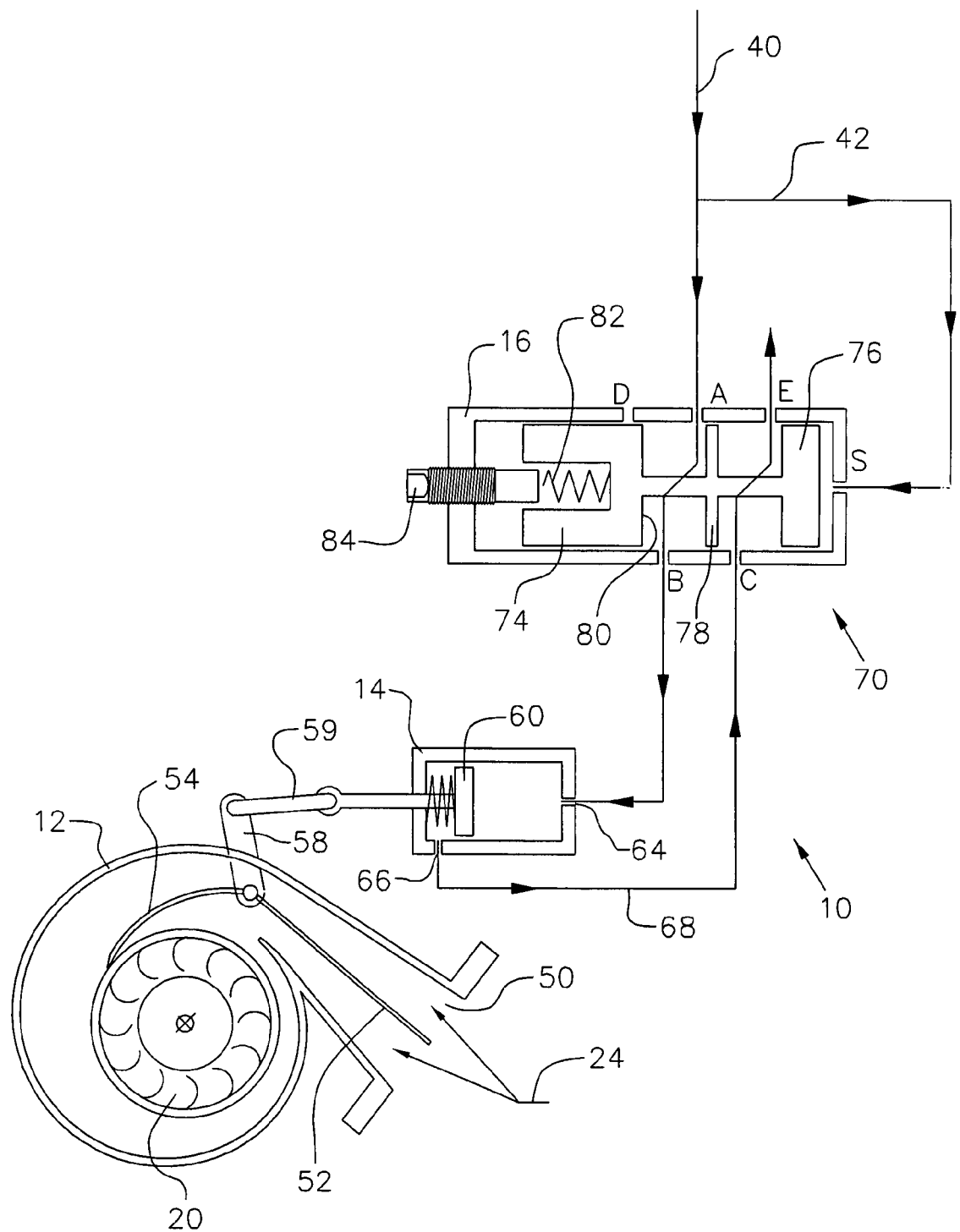
FIG. 3 is a schematic depicting the operation of the turbocharger and the flow control gate of this invention when a need for initial boost is signaled and the engine becomes loaded.
Figure 4:
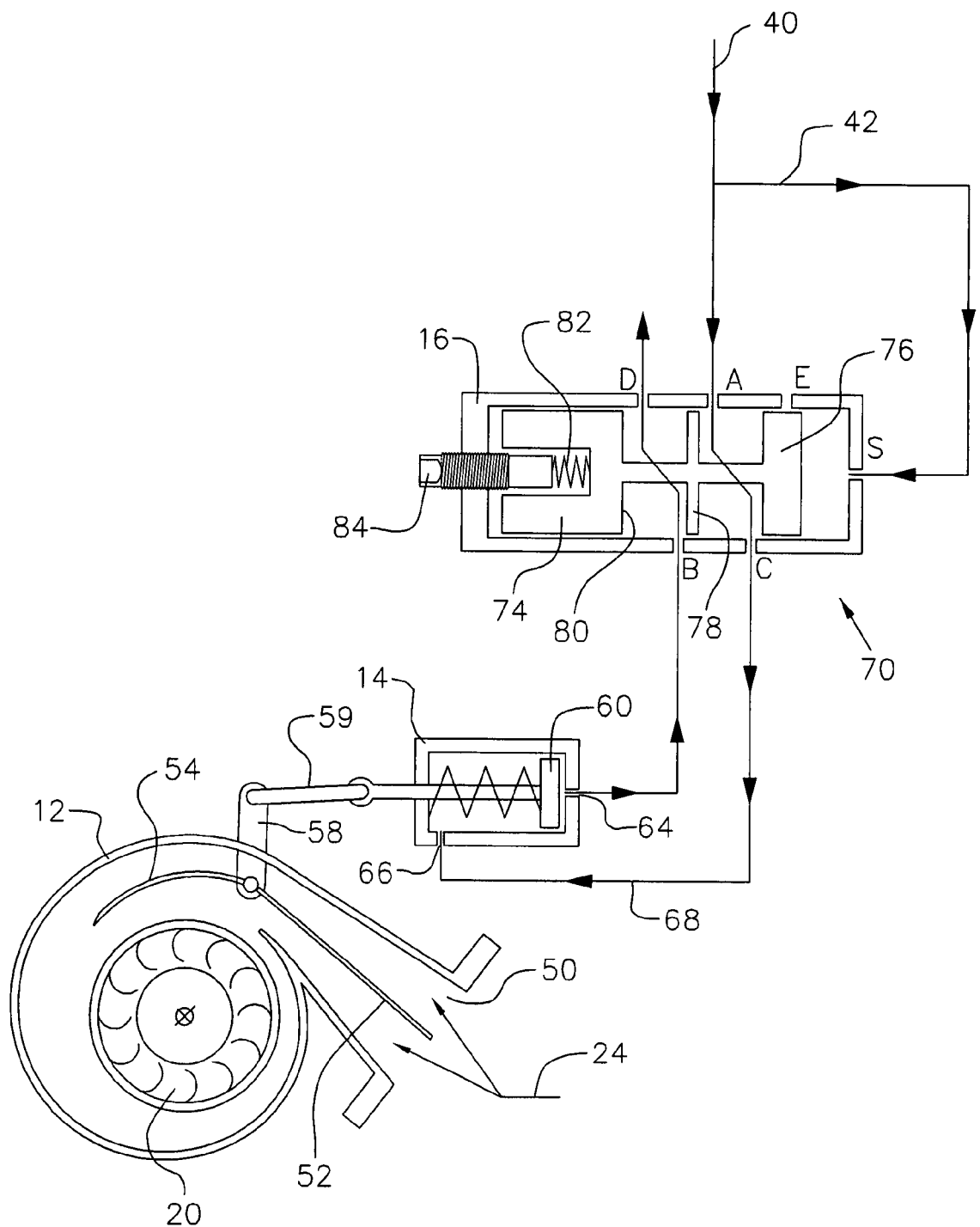
FIG. 4 is a schematic depicting condition as the engine continues to provide boost pressure and/or returns to the neutral position.

Referring now to FIGS. 2, 3 & 4 where like numerals refer to like parts, the turbocharger control system 10 includes a turbine housing 12 of a typical volute or spiral type having an inlet 50 which directs the engine exhaust 24 into rotor 20 and its vanes.

A fixed flow splitter 52 divides the flow of exhaust gases entering the inlet. Such division may create equal or unequal outer and inner flow passages. A flow control gate 54 is attached to a downstream end of the flow splitter 52 and is pivotal from a neutral first position as shown in FIG. 2 to a second position, shown in FIG. 3, toward and contiguous to rotor 20 for timely creating and directing a higher velocity flow of exhaust gases into said rotor.

Figure 5:
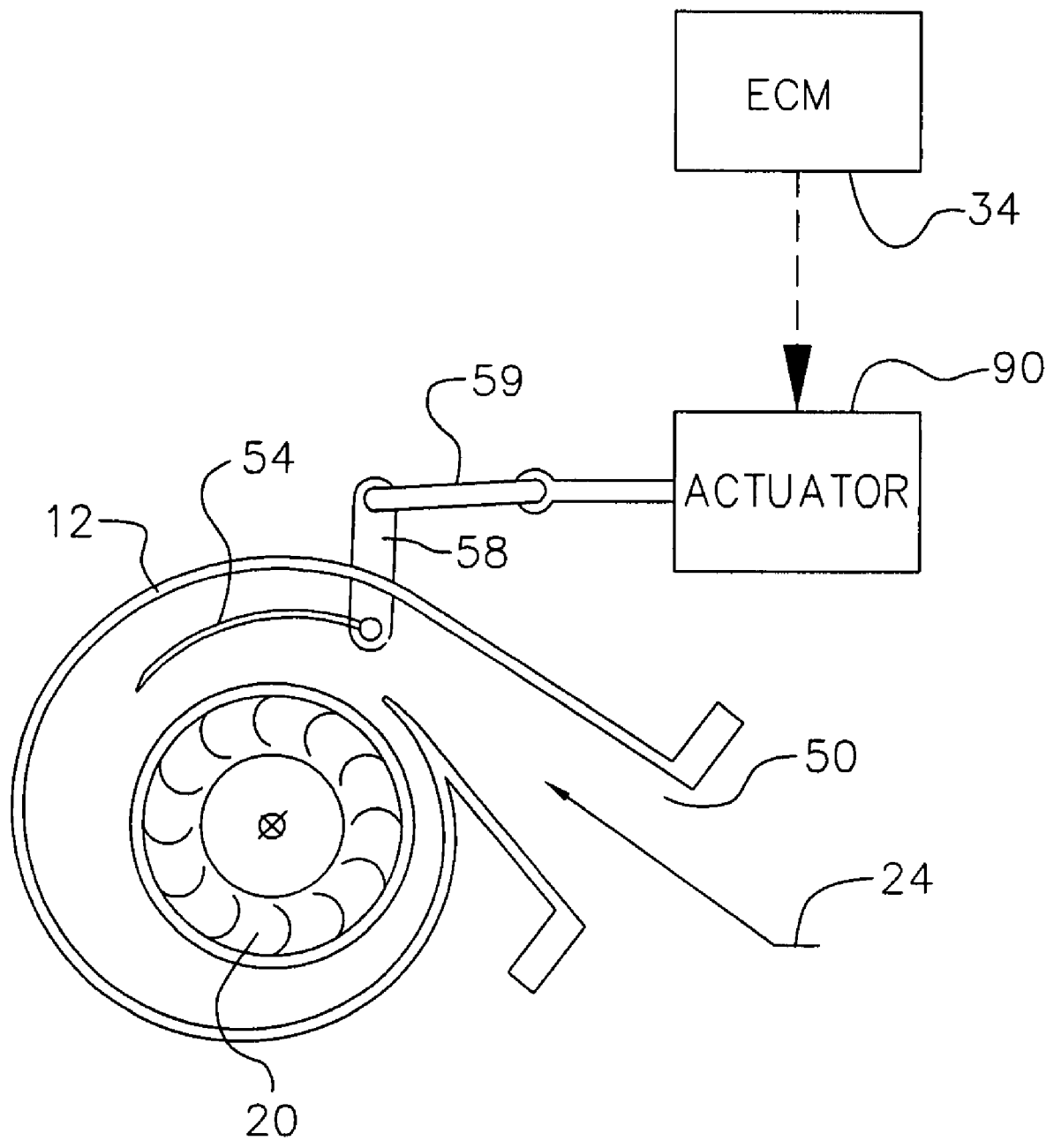
FIG. 5 is a schematic of an alternate embodiment of flow control gate.

The flow control gate 54 includes a crank arm 58 attached to a spring biased piston 60 within actuator housing 14. Openings 64 and 66 in the housing 14 allow for actuation and exhaust of boost pressure air on each side of the piston 60. As shown in FIG. 5 the flow control gate 54 can be actuated by and electric, pneumatic or hydraulic actuator 90 controlled by an ECM 34.

A directional flow control valve generally designated by the numeral 70 includes housing 16 having a two position spool 74. The spool 74 is comprised of pistons 76, 78, and 80. A spring 82 normally urges spool 74 toward the right. The tension of spring 82 is changed by threaded adjuster 84. The spool 74 is adapted to provided directional flow control to sequentially open and close upper ports D, A, and E and lower ports B and C creating work ports and return ports during the cycle of operation of the turbocharger. In the sequence of operation, port S at the end of the housing 16 exhausts and directs flow against piston 76.

When the turbocharger and control system 10 is in the position of FIG. 2, the engine is in a neutral or light load situation. That is, the boost pressure air is insufficient to operate the turbocharger control system.

FIG. 3 represents the turbocharger and control system 10 when initial demand is made to load or speed up the engine.

In a typical operation, when speed up of the engine is demanded, the vehicle operator will actuate the fuel throttle. As the internal combustion engine 22 speeds up there is an increase in exhaust gas flow via 24 with increased rotation of turbine rotor 20. Substantially simultaneously, the compressor 18 increases boost pressure in conduit 30 to the intake manifold 32 of the engine. In accordance with this invention this initial boost pressure is passed through conduit 40 to the directional control valve 70. This initial boost pressure along with the action of spring 82 is sufficient to move the flow control valve spool to the right. As a result, the initial boost pressure air flows via work ports A to B to the actuator port 64 forcing piston 60 and rod 59 to the left. Exhaust air from the back side of the piston flows via return port 66 through ports C to E of the directional valve 70.

The movement of the crank arm 58 actuates flow control gate 54 as shown in FIG. 3. This movement pivots the flow control gate 54 toward and contiguous to the turbine rotor. This results in a substantially immediate speed up of the rotor, and a build up of boost pressure and thereby greatly reducing turbo time lag.

As the boost pressure increases to a given amount it passes via 40 and 42 to port S of the directional control valve 70. The pressure is sufficient to move the spool to the left against the tension of the adjustable spring 82. Thus, the given boost pressure to accomplish movement is determined by the tension of the adjustable spring 82. That is, increase spring tension requires a higher boost pressure and thus causes the flow control gate 54 to be closed for longer time periods and vice versa.

As the engines continues speed-up the resulting boost pressure via passages A through C returns the piston 60, the spool 74 and the flow control gate 54 to the neutral position. Exhaust flow from port 64 of the actuator piston passes via ports B through D as shown in FIG. 4.

Figure 6:
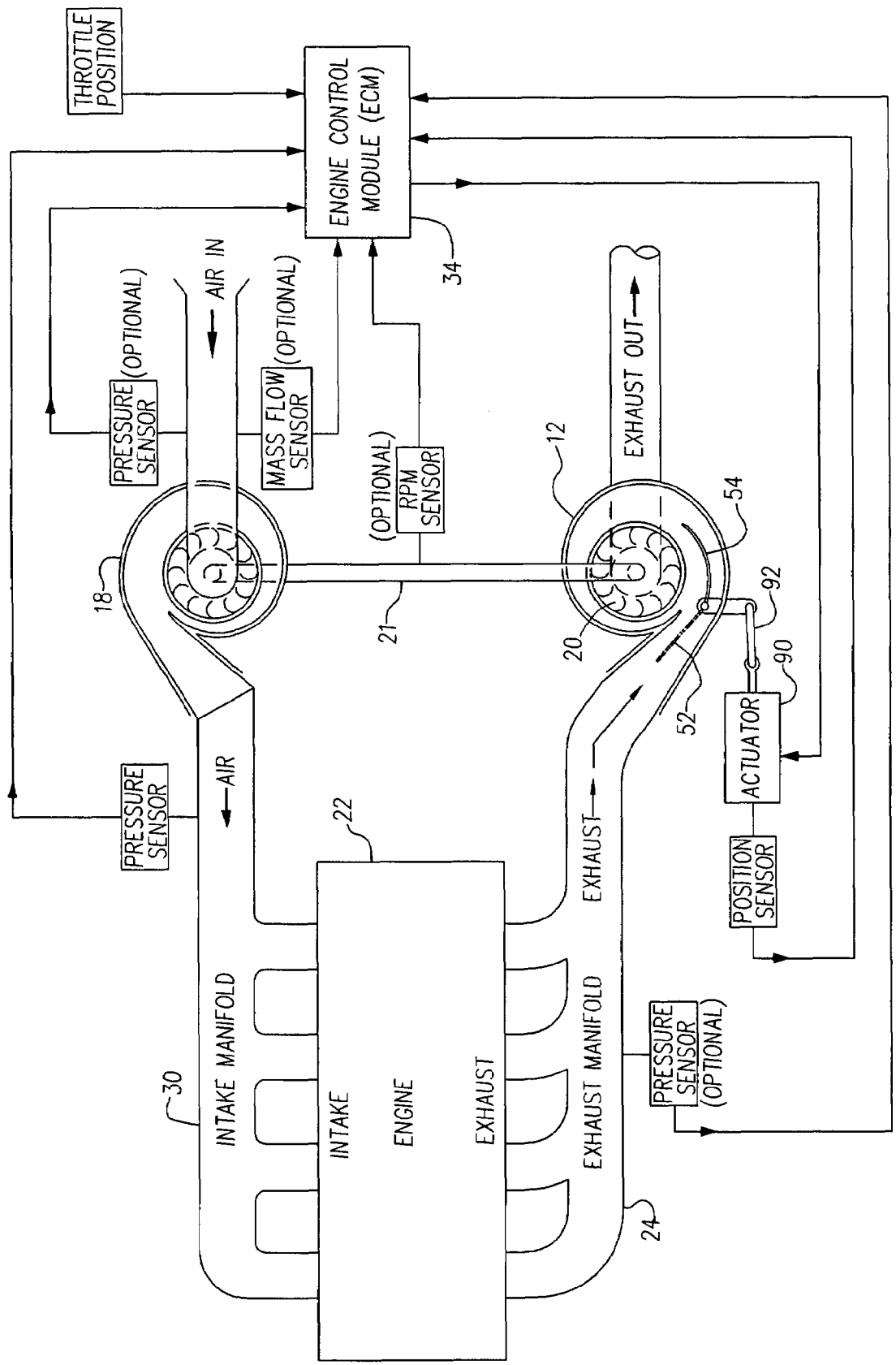
FIG. 6 is a block diagram of another form of engine and turbocharger control system using an ECM in combination with other engine systems sensors.

FIG. 6 represents a modified engine turbocharger control where like numbers refer to like parts from other views. The ECM in this view receives input from a variety of sensors. Sensors provided by the vehicle manufacturer or a turbocharger manufacturer are well known in the art. The ECM 34 is typically a programmable computer module containing algorithms to optimize the engines performance under all variable load and speed requirements along with information received from a variety of engine performance sensors.

In this invention information fed to the ECM is used to control the position of the flow control gate 54 by means of actuator 90. Such control includes actuators for providing movement, preferably two position means, for timely closing and opening the flow control gate 54 as explained herein. Such actuators include electrical relay, solenoid or other electric proportional control, or valving that would operate either a hydraulic or pneumatic actuator. Typical of such actuators include, but not limited to, linear actuators and position sensors such as sold by MPC Products Corp. Of Skokie, Ill.; Accent Bearings Co. Of Addison, Ill.; ETI Systems of Ft. Worth, Tex.; PFA pneumatic linear actuators of Fabco-Air, Inc. of Gainsville, Fla.; and LVDT electro-mechanical transducers as sold by Macro Sensors division of Howard A.

Schaevitz Tech. Inc. of Pennsauken, N.J. These products are listed here by way of example only.

A position sensor would feed back information to the ECM 34 as to the position of the flow control gate 54. Based on this and other information from sensors such as shown in FIG. 6, appropriate correction as to the flow control gate position can be made.

An analog actuator 90 along with sensor input to the ECM would allow the flow control gate 54 to be in an optimal position (not necessarily fully closed) to accelerate the turbine to a desired boost at any speed and load condition. The ECM 34 could respond to small throttle position changes to move the flow control gate 54 only as required to make smaller changes to achieve the desired boost. This would minimize exhaust back pressure that robs horsepower and hurts fuel efficiency. As explained herein the purpose of the invention is to use the flow control gate as a means to provide a rapid increase in horsepower by a substantially immediate spin up of the turbine rotor until optimal boost pressure is obtained no matter at minimal or low load conditions or at mid range cruising at highway speeds.

The embodiments and modes of operation of the invention should not be construed as limiting to the particular forms as described. Variations and changes, as for example in the overall control of various types of internal combustion engines, e.g., gas, diesel and various vehicle types, e.g., highway, off-road, motorcycles, etc. may be made by those skilled in the art without departing from the scope and spirit of the present invention and the appended claims.

The invention claimed is:

1. A turbocharger for an internal combustion engine comprising;
   a turbine housing;
   said turbine housing having a turbine rotor;
   said turbine housing having an inlet for directing exhaust gases from said internal combustion engine into said turbine housing;
   a fixed exhaust gas flow splitter in said inlet for dividing flow of exhaust gases entering said inlet;
   a flow control gate hinged to a downstream end of said flow splitter to move, said flow control gate having an outer side and an inner side;
   said flow control gate being timely pivotal from a neutral first position allowing substantial flow of inlet exhaust gas across said outer side and said inner side into said exhaust turbine, to a second position contiguous to said turbine rotor for creating and directing a higher velocity flow of said exhaust gases to said turbine rotor; and
   means to pivot said flow control gate to and from said first and second positions.

2. The turbocharger of claim 1, wherein said fixed exhaust flow splitter divides said inlet flow of exhaust gases substantially equally.

3. The turbocharger of claim 1 wherein said fixed exhaust flow splitter divides said inlet flow of exhaust gases substantially unequally.

4. The turbocharger of claim 1 wherein said means to pivot said flow control gate is an actuator with a moveable member connected to said flow control gate.

5. The turbocharger of claim 4 wherein said actuator is controlled by an ECM.

6. The turbocharger of claim 5 wherein said actuator is hydraulic.

7. The turbocharger of claim 5 wherein said actuator is pneumatic.

8. The turbocharger of claim 5 wherein said actuator is electrical.

9. The turbocharger of claim 1 including:
   a compressor having an impeller driven by said turbine rotor for directing compressed air into an intake manifold of said internal combustion engine; and
   means to timely pivot said flow control gate as a function of a given boost pressure of said compressed air.

10. The turbocharger of claim 9 wherein said means to pivot said flow control gate is initiated from an engine control module signal.

11. The turbocharger of claim 9 wherein said means to timely pivot said flow control gate comprises:
    an adjustable directional flow control valve:
    an actuator cylinder and reciprocating piston;
    said flow control valve having means for receiving, directing and exhausting a portion of said compressed air to and from said actuator cylinder to reciprocate said piston; and
    means connecting said piston to said flow control gate.

12. The turbocharger of claim 11 wherein said adjustable directional flow control valve comprises a valve body with a right and left end;
    flow ports in said valve body for receiving and directing boost pressure air;
    a two position slidable spool valve within said housing for timely controlling said flow through said openings;
    spring means and a given first amount of said boost pressure normally biasing said spool to said right end position; and
    means whereby a second amount of boost pressure will force said spool to a left position against said spring.

13. The turbocharger of claim 12 wherein said spring is adjustable.

14. A turbocharger of claim 1 wherein said flow splitter in said inlet divides said flow of exhaust gases into an outer flow passage and an inner flow passage; and wherein said higher velocity flow of said exhaust gas occurs in said inner flow passage adjacent said turbine rotor.

15. A turbocharger for an internal combustion engine comprising;
    a volute-type turbine housing;
    said turbine housing having a turbine rotor;
    said turbine housing having an inlet for directing exhaust gases from said internal combustion engine into said turbine housing;
    an arcuate flow control gate, said flow control gate transversely hinged within said inlet for pivotal movement toward and away from said turbine rotor from a neutral first position allowing substantial flow of exhaust gas into said exhaust turbine to a second position contiguous to said turbine rotor for creating and directing a higher velocity flow of said exhaust gases to said turbine rotor; and
    means to pivot said flow control gate to and from said first and second positions.

16. The turbocharger of claim 15 wherein said means to pivot said flow control gate is by an actuator having a moveable member connected to said flow control gate.

17. The turbocharger of claim 16 wherein said member is hydraulically actuated.

18. The turbocharger of claim 16 wherein said member is pneumatically actuated.

19. The turbocharger of claim 16 wherein said member is electrically actuated.

20. The turbocharger of claim 16 wherein said actuator is controlled by an ECM.

21. A turbocharger for an internal combustion engine comprising;

a volute-type turbine housing;

said turbine housing having a turbine rotor;

said turbine housing having an inlet for directing exhaust gases from said internal combustion engine into said turbine housing;

a pivot attached to said housing in said inlet, said pivot being substantially transverse to the flow of said exhaust gases a flow control gate hinged to and downstream of said pivot, said flow control gate having an outer side and an inner side;

said flow control gate being timely pivotal toward and away from said turbine rotor from a neutral first position allowing substantial flow of exhaust gas across said outer side and said inner side into said exhaust turbine, to a second position contiguous to said turbine rotor for directing a higher velocity flow of said exhaust gases to said turbine rotor; and means to pivot said flow control gate to and from said first and second positions.

22. The turbocharger of claim 21 wherein said means to pivot said flow control gate is by an actuator having a moveable member connected to said flow control gate.

23. The turbocharger of claim 22 wherein said member is hydraulically actuated.

24. The turbocharger of claim 22 wherein said member is pneumatically actuated.

25. The turbocharger of claim 22 wherein said member is electrically actuated.

26. The turbocharger of claim 22 wherein said actuator is controlled by an ECM.

27. The turbocharger of claim 21 wherein said flow control gate is arcuate.

28. The turbocharger of claim 27 wherein said arcuate is shaped coincident with said volute.

* * * * *